(12) United States Patent
Doering et al.

(10) Patent No.: US 6,984,306 B2
(45) Date of Patent: Jan. 10, 2006

(54) METHOD FOR REMOVING INORGANIC COMPOUNDS FROM A SECTION OF SOIL

(76) Inventors: Falk Doering, Burghaldenweg 51, Stuttgart (DE) 70469; Niels Doering, Burghaldenweg 51, Stuttgart (DE) 70469

( * ) Notice: Subject to any disclaimer, the term of this patent is extended or adjusted under 35 U.S.C. 154(b) by 311 days.

(21) Appl. No.: 10/182,726

(22) PCT Filed: Feb. 8, 2001

(86) PCT No.: PCT/EP01/01368

§ 371 (c)(1),
(2), (4) Date: Aug. 12, 2002

(87) PCT Pub. No.: WO01/58610

PCT Pub. Date: Aug. 16, 2001

(65) Prior Publication Data

US 2003/0146099 A1    Aug. 7, 2003

(30) Foreign Application Priority Data

Feb. 10, 2000  (DE)  .................................. 00102787

(51) Int. Cl.
   *B09C 1/00*  (2006.01)
(52) U.S. Cl. ................... 205/766; 204/515; 588/302
(58) Field of Classification Search ........... 204/515; 205/766; 588/204, 302
   See application file for complete search history.

(56) References Cited

U.S. PATENT DOCUMENTS

| | | | |
|---|---|---|---|
| 5,074,986 A | 12/1991 | Probstein et al. | 204/130 |
| 5,137,608 A | 8/1992 | Acar et al. | 204/130 |
| 5,595,644 A * | 1/1997 | Doring et al. | 205/766 |
| 5,738,778 A * | 4/1998 | Doring | 205/701 |
| 6,086,739 A * | 7/2000 | Hodko | 204/515 |
| 6,280,601 B1 * | 8/2001 | Doring | 205/701 |

FOREIGN PATENT DOCUMENTS

| | | |
|---|---|---|
| DE | 39 20 342 | 8/1990 |
| DE | 43 01 270 | 1/1994 |
| EP | 0 312 174 | 4/1989 |
| EP | 0 504 551 | 9/1992 |
| EP | 0 729 796 | 9/1996 |

* cited by examiner

*Primary Examiner*—Arun S. Phasge
(74) *Attorney, Agent, or Firm*—Jacobson Holman PLLC

(57) ABSTRACT

The invention relates to a method for removing inorganic compounds from a section of soil. By regulating an electric voltage applied between two or more electrodes (1, 2) disposed in the section of soil (3) to values equal or below the electrokinetic point (61), inorganic compounds are electrochemically modified in situ in such a manner that they are electrokinetically mobilized and can be directly deposited on the electrodes (1, 2). According to the invention, the electrokinetic point (61) is adjusted and reached by applying a voltage to the electrodes (1, 2) and controlling it, once, after passing a first current/voltage zone (62) of a first gradient, a second current/voltage zone (63) of a second gradient that is smaller than the first gradient is reached.

21 Claims, 3 Drawing Sheets

METHOD FOR REMOVING INORGANIC COMPOUNDS FROM A SECTION OF SOIL

Figure 1:
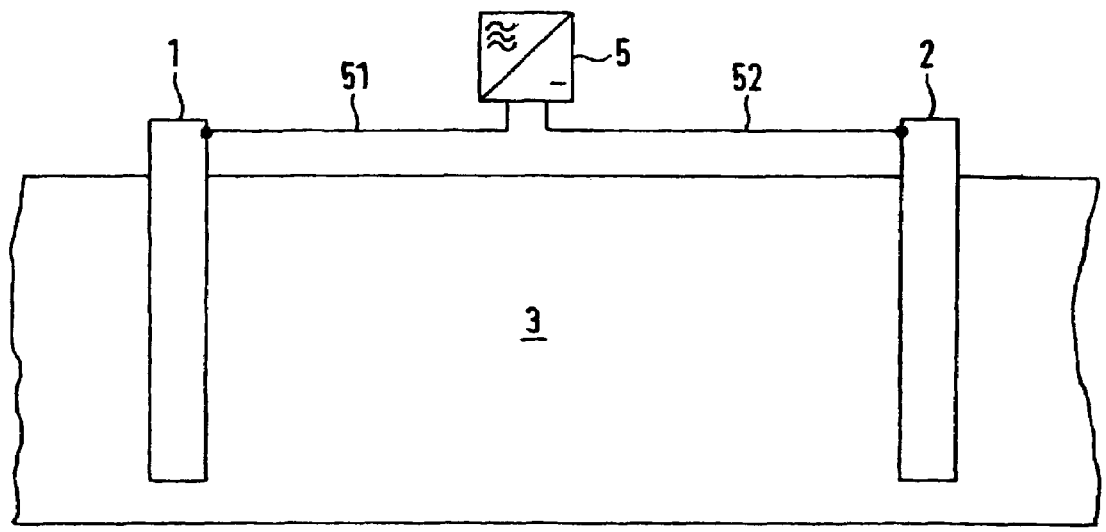

This is a nationalization of PCT/EP01/01368 filed Feb. 8, 2001 and published in German.

The present invention relates to a process for the removal of inorganic compounds from the ground area in situ by regulation of an electrical voltage applied between two or more electrodes.

The invention relates in particular to electrochemical in-situ conversion of inorganic hazardous materials in the ground for the purposes of their electrochemical mobilization in the ground and their deposition on both electrodes of an electrode arrangement mounted in the ground. Since in the process according to the invention the electrochemical formation of complex ions represents the most important component of the process, the name "induced complexing" was given to the process.

The state of the art in the removal of inorganic hazardous materials from soils has been described by electrokinetic processes such as appear in the patents U.S. Pat. No. 5,074,986 (Dec. 24, 1991; MIT; Probstein et al.), U.S. Pat. No. 5,137,608 (Aug. 11, 1992; LSU; Acar, Gale et al.), European Patent Application EP 0 312 174 (Oct. 13, 1998; Pool, Lageman et al.), and DE 3 920 342 (Döring). The fundamental principle of electrokinetic decontamination of the ground is based accordingly on the generation of an electric field below ground, through which electric field an intended movement of the hazardous materials is triggered. Through the action of the electric current on the hazardous materials, however, the hazardous materials are not changed chemically. A decontamination system consists in this case essentially of electrodes (cathode-anode) disposed in an area of ground to be decontaminated and corresponding reservoirs which, for example, are formed by semi-permeable electrode chambers. To the electrodes a DC current is applied from a DC current source. Through the applied field electrokinetic processes arise in the ground area which cause the transport of the pore water of the ground and the mobile (ionic, colloidal) hazardous materials dissolved therein. Positively charged ions, molecular radicals, and colloids migrate to the cathode and negatively charged particles migrate to the anode. Therein the pore water functions as an electrically conducting medium through which the charged particles are transported under the influence of the electric field forces to the oppositely charged electrode.

The electrokinetics is divided basically into three different mechanisms, namely ion transport, electro-osmosis, and electrophoresis.

In the case of ion transport, ions and ionic complexes are moved in the pore liquid.

In the case of electro-osmosis the pore water and the hazardous materials dissolved therein are moved via diffusive ion layers on the capillary boundary surface between the pore solution and mineral.

Of course, this process only occurs if the ground has the permeability of a semi-permeable membrane such as, for example, in the case of clay and very fine-grained soils.

Electrophoresis corresponds to the movement of charged, suspended colloids and ground particles in the electric field.

In the following the aforementioned mechanisms are called "electrokinesis." Electrokinesis is merely a transport mechanism. The removal of the hazardous materials is a part of the process independent of the electrokinesis. The removal of the hazardous materials is done as a rule by pumping the ground water loaded with hazardous materials and flowing into the semi-permeable electrode chambers, said ground water then having to be treated in expensive waste water treatment plants.

The electrokinetic processes according to the state of the art have a series of defects. Thus the electric efficiency of the electrode system is clearly affected by the construction of the semipermeable electrode chambers by geotextiles, membranes, and/or double-wall systems. In individual cases it was, due to the high actual electric resistances between the electrodes, no longer possible to drive a sufficient current intensity at acceptable voltages. A further defect of the electromagnetic processes consists of the fact that all the ions and colloids in the ground water are transported to the electrodes non-selectively and have to be eliminated from the water pumped out off the electrode reservoirs on-site in expensive water purification plants, although, for example, hardening agents are not hazardous materials and thus do not have to be removed from the water. A series of inorganic hazardous materials such as, for example, mercury sulfide, minium, or arsenic trioxide do not respond at all to electrokinetic mobilization and thus remain as latent hazardous materials in the ground.

From the document DE 43 01 270.1 A1 a process is known which to be sure only electrochemically destroys organic hazardous materials in situ. This process is carried out in such a way that, in one step for increasing the conductivity of the ground between the electrodes by application of a voltage, an ionization channel is generated and in a second step an operational voltage is regulated by setting the current intensity in such a way that the energy used is equal to or greater than the electron affinity of the hazardous material molecule or its radicals. In so doing, an oxidation of the hazardous materials occurs by electron reaction. From the Patent Application EP 0 729 796 A1 a process is known according to which organic hazardous materials are decomposed by redox reactions on the polarized ground particles into $CO_2$ and water. This process described in both documents is called "geooxidation" in the following.

The objective of the present invention consists of providing a process according to which in the first place the in-situ electrochemical conversion of inorganic hazardous materials can be done with a higher purification capacity than the electrokinetic processes have, in the second place water-insoluble inorganic substances can be converted to ions, in the third place the ions which are to be removed from the ground can be selected, and in the fourth place the removal of the hazardous materials can be done in a relatively simple manner.

The problem is solved by the means of the process of the present invention.

The essential advantage of the present invention consists of the fact that inorganic compounds can be converted in situ by special control of the voltage applied between two electrodes disposed in the ground so that they can be mobilized electrokinetically and deposited directly on the surfaces of the electrodes and there form a galvanic coating which is removed from the ground with the electrodes at the end of the decontamination of the ground. Thus an expensive water conveyance and water purification of the water pumped by the electrodes is omitted.

To carry out the aforementioned objective, different reaction paths are required than in the case of geooxidation.

Figure 4:
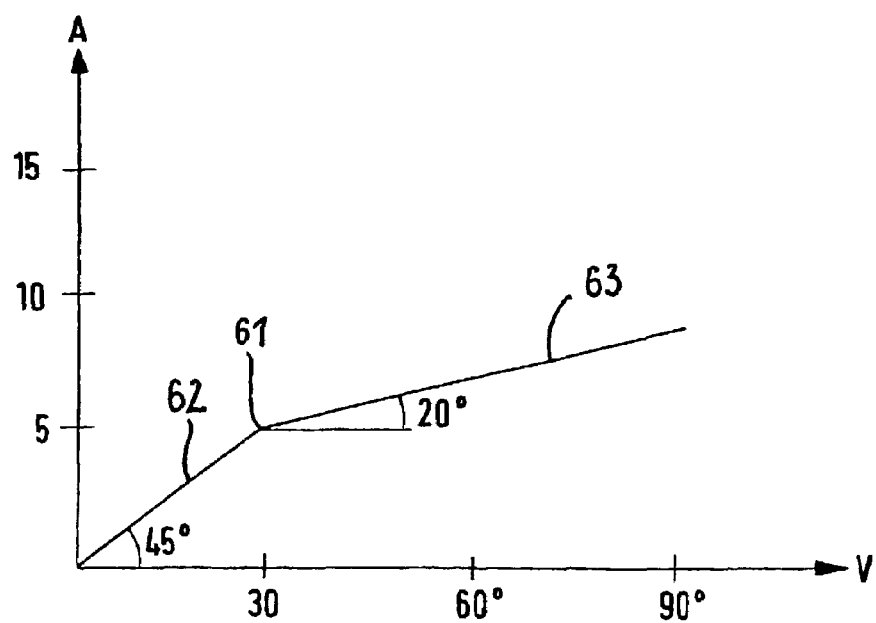
Figure 2A:
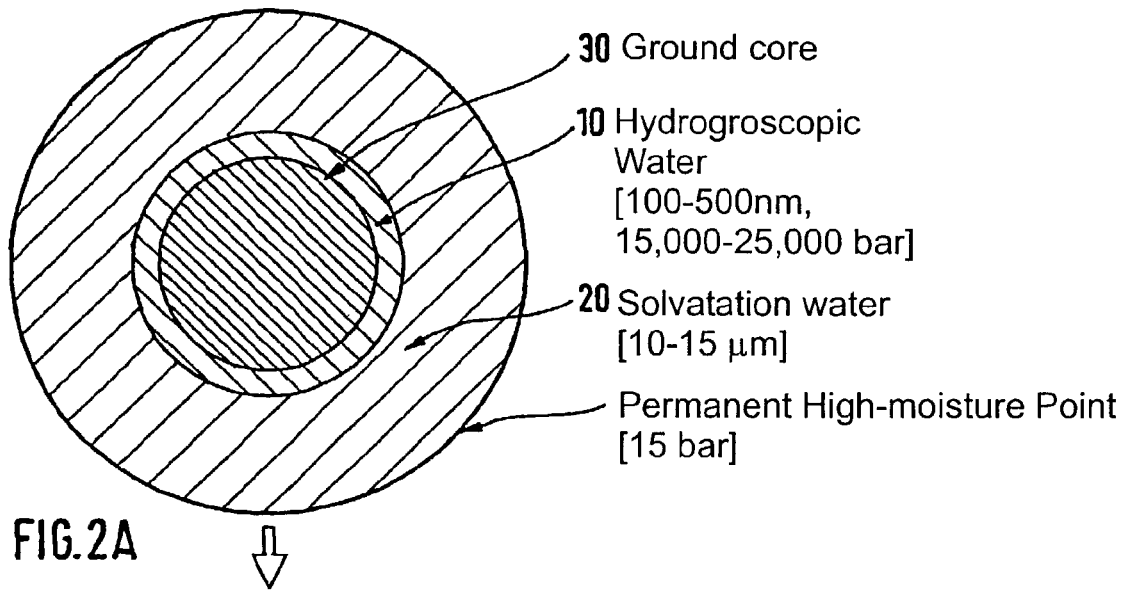
Figure 2B:
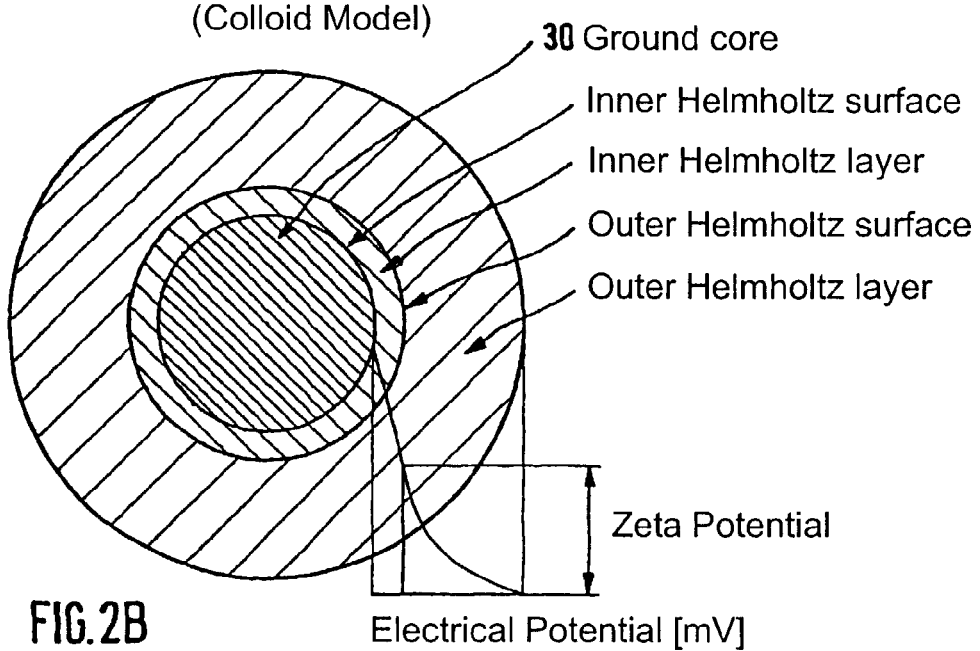
Figure 3:
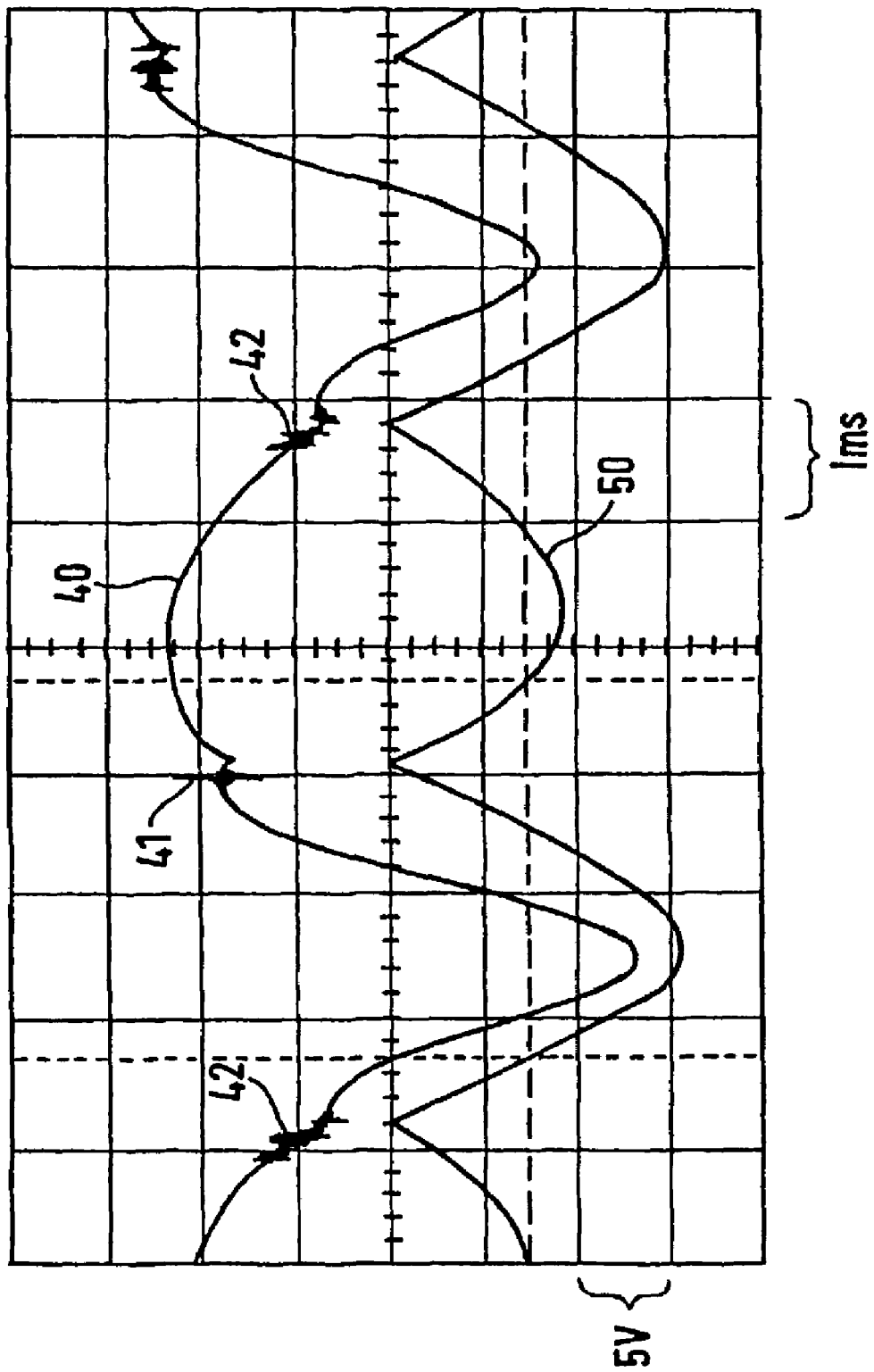

In the following, the invention and its developments are explained in more detail with the figures. Show are:

FIG. 1 in schematic presentation, an electrode arrangement disposed in a ground area for the hazardous material decontamination according to the present invention, FIG. 2 representations to explain the colloid model, FIG. 3 an oscillogram to explain the origin of transient voltages through the residual ripple of a DC current applied to the electrodes, and FIG. 4 a diagram to explain the first step of the process according to the invention in which a transition range between geooxidation and electrokinetic is sought.

According to FIG. 1 electrodes 1 and 2 are introduced, at a distance from one another, into a ground area 3, from which hazardous materials in the form of organic compounds are supposed to be removed, to which electrodes a DC voltage is applied from a DC source 5 via the lines 51 and 52. The electrodes 1 and 2 serve as the site of the deposition of selected ions, complex ions, and colloids, in particular however, metalloids, metals, and heavy metals. The expensive water conveyance and water purification on-site can be completely omitted. The electrodes 1 and 2 are installed horizontally or vertically depending on the working depth in the ground. The electrodes 1 and 2 should preferably have a surface which is equal to or greater than the surface of a 5" or 6" tube or the corresponding surface as a plate electrode.

New insight gained in the framework of the research relating to the process [makes it] necessary to redefine the state of the art regarding the electrochemical properties of the ground. The consideration necessarily begins with retained water (the portion of the ground matrix water which cannot be removed). The term "ground particle" used in the following also includes particles of hazardous materials.

It is the state of the art that water retained in the ground area 3 is held by various forces at various intensities to the ground particle, among which are to be counted the hazardous material particles 30 (FIG. 2A) contained in the ground area 3. Around the ground particle 30 are formed two water envelopes, namely an inner hydrate envelope 10 of adsoprtion water (hygroscopic water) which is held by electrostatic forces, such as Coulomb forces, van der Waals forces, or London's forces, on the surface of a ground particle with excess pressure of 10,000 to 25,000 bar, as well as a second outer hydrate envelope 20 of hydration water (solvatation water). The inner hydrate envelope 10 has a thickness in the range of picometers to nanometers while on the other hand the second hydrate envelope 20 has a layer thickness of several nanometers to several micrometers. The concept underlying the invention consists of the insight that the retained water shell structure according to FIG. 2A conforms to the Nemst-Stern colloid model (FIG. 2B) in nearly all essential details. Thus the electrochemistry of the colloid can be substantially related to the electrochemistry of the ground. Thus the terminology of hydrogeology can be made substantially compatible with the terminology of colloid chemistry. The adsorption water (inner hydrate envelope 10) corresponds approximately to the inner Helmholtz layer, the hydration water (outer hydrate envelope 20) to the outer Helmholtz layer, also known as the diffuse layer. Both between the core of the colloid and the inner Helmholtz layer and between the inner and outer Helmholtz layer, electrochemically active boundary surfaces are present at which electrochemical reactions and the transport of electrons in the ground take place. The potential between the boundary surface encircling the core and the outer boundary of the diffuse layer is called the Nernst potential, the potential drop within the diffuse layer the zeta potential.

The insight opens new possibilities for electrochemcially converting inorganic hazardous materials, where the energy required for these reactions is provided by the colloid structure of the ground, namely from the properties of the colloid as a capacitor. This capacitor has the following properties: the dielectric constant H between the hydrate envelopes 10 and 20 is temperature-dependent between 87.74 (0° C.) and 81.95 (15° C.). The thickness of the dielectric lies in the range of several nanometers. The natural capacitance of the ground (without artificial energizing with current by decontamination measures) is between $C=4.5\ \mu F$ and 15 $\mu F$.

With regard to the capacitor effect of the ground particle, two states are to be distinguished.

(a) Application of a DC current which charges the capacitor. With a constant recharging by electrons, electrons flow from the capacitor in part in transient discharges. In this process, the intensity of the transient discharges is significantly improved by the application of a special DC voltage loaded with a residual ripple.

An oscillogram is contained in FIG. 3, said oscillogram having been plotted at a construction in southwest Texas and accordingly having a frequency of the residual ripple of nominally 360 Hz, actually 329.5 Hz. The voltage in the oscillogram is related to the residual ripple and is measured between two electrodes while the current intensity is measured at the output terminals of the rectifier (output current intensity). If a DC current is applied to the electrodes 1 and 2 in the ground area 3, said DC current being loaded with an AC current component, preferably a residual ripple of the rectification of an AC current and the voltage being set so low that it does not immediately penetrate the dielectric but rather can charge said "capacitor," then transient discharges are to be expected. In the field measurements in powdery soils in southwest Texas the first demonstration of the transient discharges, which simultaneously serve to confirm the colloid theory, could be conducted. Repetitions of the measurements in Germany and Denmark confirmed this phenomenon. In FIG. 3 the upper curve 40 represents a rectified DC voltage superimposed with a residual ripple. At the edges of the voltage curve 40 transient discharges occur at each of the points 41 and 42, e.g., on the order of magnitude of 2 to 5 volts, in part however also by 2 to 4 powers of ten higher. The lower current curve 50 shows that, as a consequence of the current discharges at the terminals of the AC/DC current converter 5, fewer electrons are drawn off, while the increase in voltage shows that more electrons flow. Thus the ground must provide the current. The transient discharges associated therewith generate a voltage level acting directly on the ground particles and hazardous materials 30, said voltage level being extremely high relative to the size of the hazardous materials and ground particles and thus providing dissociation, activation, and reaction energies which are necessary for the conversion reactions of hazardous materials 30. Providing these energies through the transient discharges described represents the decisive prerequisite for the conversion reactions in the case of geooxidation but also in the case of the reactions running here for the electrochemical conversion of inorganic hazardous materials.

For example, 600 transient discharges per second are to be expected with a 6 pulse rectification and a rotary current of 400 V and 50 Hz per electrode pair 1 and 2 depending on the circumstances of the system. In FIG. 3 the curve 40 conforms on the y-axis for a partial interval 5 V. At each of the edges of the curve 40 transient discharges (points 41 and 42) on the order of magnitude of 2 to 5 V can be seen. It is noted that, for example, the dissociation energy, which must be applied in order, for example, to split one molecule or one atom, is on the order of magnitude of 45 kcal×mol$^{-1}$ and about 120 kcal×mol$^{-1}$, where one kcal corresponds to 1.62464 Wh.

The colloid theory is supported by a second observation. In FIG. 4 a voltage curve can be seen which should drive the current intensity plotted on the y-axis. The ground is an ohmic consumer. In the measurements at a construction site in southwest Texas it was observed that voltage and current intensity (range 62) increased linearly in relation to one another first from 15V/15 A to 38V/38 A, that is, the resistance between the two electrodes 1 and 2 was 1, that thereafter however (range 63) at 38.5 V (inflection point 61) for each additional ampere no longer one V but rather now 3.2 V were needed, that is, the resistance increased to 3.125. On the oscilloscope the transient discharge peaks disappeared at the inflection point 61. The analysis of this phenomenon led to the advance of the state of the art. We have called the inflection point 61 of the increase curve (or the dissipation resistance between two electrodes 1 and 2) the "electrokinetic point." Below this electrokinetic point (range 62) the colloidal conductivity of the ground with the additional energy supply in the form of transient discharges of the ground particle in its property as capacitor prevails. Above the electrokinetic point (range 63) the ionic conductivity predominates in the determination of the increase of the electric resistance between two electrodes 1 and 2 if the electrons penetrate the dielectric and then trigger the electrokinetic processes.

The essence of the present invention consists of applying a voltage to the electrodes 1 and 2 mounted in the ground area 3 and regulating it so that either electrochemical reactions occur at each individual ground particle or electrokinetic transport processes occur which go over into the electrochemical (galvanic) deposition of the selected ions, complex ions, and colloids on both electrodes.

Among the electrochemical reactions below the electrokinetic point 61 are:

(1) the change of the oxidation number of, in particular, metals and metalloids, thus, for example, of hexavalent Cr into divalent or trivalent chromium or of Hg$^0$ to Hg$^+$, (2) the splitting of water-insoluble inorganic compounds into their elementary basic components.

Thus, for example, HgS decomposes into metallic mercury and colloidal sulfur. The same applies, for example, for minium ($Pb_3O_4$) or arsenic trioxide ($As_2O_3$), (3) the conversion of non-polar substances such as metallic mercury (Hg$^0$) into colloids, (4) the formation of complex ions (induced complexing) in large part with two or more central atoms which can also be occupied by different metal atoms. Among these, in a chlorinated environment (brackish water or sea water) are the formation of chlorocomplex ions, usually in the form of an $HgCl_3$ double band or an $HgCl_4$ band which are deposited on the anodes. Furthermore, in the case of other soils, hydroxocomplex ions and/or ammine salts have been found, (5) formation of coordination compounds by means of oxygen atoms, CN radicals, water molecules, and $NH_3$ groups, (6) the conversion of certain metals and metalloids (such as Sn, As, Sb, and Te) to hydrides which are gaseous and are extracted from the ground via the gas path.

As a rule in metals the aforementioned colloids and complex ions can be deposited anodally galvanically in the boundary range of the electrokinetic point 61. The selection of the metals and metalloids to be deposited is done by the choice of the electrode materials, which are chosen from case to case depending on the decontamination objective. Thus, for heavy metals, iron (steel, in particular unalloyed or slightly alloyed structural steel) and aluminum are chosen as cathode material. The anode materials should be resistant to processes of anodic oxidation. Among these are graphite and carbon materials, titanium, materials vapor-deposited with titanium, coated with titanium, or otherwise treated with titanium, and steels.

The aforementioned insights were investigated and tested in several field projects. In a canal carrying brackish water in England a high contamination with mercury from the manufacture of mercury fulminate was encountered. Due to the high percentage of organic mercury compounds it was decided first to split off first in a preliminary phase the organic mercury compounds with current parameters below the electrokinetic point 61 which lay at 142.5 V DC and 16 A. Tubes with a diameter of 180 mm, 16 m long, and laid horizontally in the canal were used. The dissipation resistance in the preliminary phase was 8.9. After three days the current intensity was increased to 20 A and the electrokinetic transport of the ions, complex ions, and colloids introduced. The voltage was set to 248 V DC, the resistance increased to 12.4. The load of the canal sediments with mercury sank in a 26-day treatment, for example, at the most highly loaded measurement point from 809 mg/kg TM to 4 mg/kg TM. In all the treated areas the high mercury load sank under the decontamination target value of 15 mg/kg TM. The mass of organic mercury compounds sank from 10.2 mg/kg TM to values below the limit of detection. The electrodes obtained after the treatment had a shining silvery (on the cathode) or dull silvery coating (on the anode), said coating not being able to be wiped off. Overall a mass increase at the electrodes of 76 kg was found. Of this, about 52% by weight fell to the anode. By X-ray structural analyses it could be determined that mercury chlorocomplex ions had been formed which also contained other metals and metalloids such as, for example, cadmium, arsenic, zinc, and vanadium.

In a roll mill's waste water mud lagoon, highly loaded with heavy metals such as, lead, copper, and zinc as well as arsenic, a decontamination trial was carried out on the scale of 1:1 for the preparation of a subsequent decontamination with current parameters below the electrokinetic point 61. The mud, which had in the meantime dried out completely, were extremely hydrophobic. Parallel to the development of a technology with which the hydrophobicity of the dried muds could be overcome, the dissipation resistances between the two plate electrodes, each 2 m$^2$, sank from 50.8: to 19.6:. The voltage was 214 V DC at 10.9 A. In a 30-day test the concentration of all heavy metals dropped off, thus, for example, in the case of lead from 460 mg/kg to 260 mg/kg, in the case of zinc from 840 mg/kg to 650 mg/kg, in the case of arsenic from 64 mg/kg to 52 mg/kg, and in the case of chromium from 9.8 mg/kg to 5.9 mg/kg. At the cathode a process of the same type was observed for almost all heavy metals. Chromium dropped off from 49 mg/kg to 8.9 mg/kg and zinc from 1,900 mg/kg to 1,440 mg/kg. In the case of lead, cadmium, and nickel only marginal concentration increases in the range of up to 10% by weight was found although according to the traditional teaching a significant enrichment of the heavy metals at the cathode was to be expected. At the electrodes an increase of the mass by 8.5 kg was found. Of that, 62% was at the cathode and 38% at the anode. The deposited mass conforms, at a degree of efficiency of galvanic deposition of 92.2%, to the deposition percentage calculated before the beginning of the trial.

What is claimed is:
1. Process for the removal of inorganic compounds from a ground area characterized by the fact, that in situ by regulation of an electrical voltage applied between two or more electrodes (1, 2) installed in the ground area (3) to values at or below the electrokinetic point (61) inorganic compounds are modified so that they can be electrokinetically mobilized and deposited directly on the electrodes (1, 2), whereby the electrokinetic point (61) is determined by the control of the voltage at the electrodes (1, 2) when a first current/voltage range (62) of a first increase, switches to a second current/voltage range (63) of a second increase, which is smaller than the first increase.

2. Process according to claim 1, characterized by the fact that in situ water-insoluble inorganic compounds are decomposed electrochemically into their elementary basic components.

3. Process according to claim 1, characterized by the fact that in situ non-polar inorganic substances are converted into colloids.

4. Process according to claim 1, characterized by the fact that in situ the complexing of atoms and molecules, in part with two or more central atoms, form a hydroxocomplex or chlorocomplex ions and/or amine salts.

5. Process according to claim 1, characterized by the fact that in situ coordination compounds are generated electrochemically by means of oxygen atoms, CN radicals, water molecules, and $NH_3$ groups.

6. Process according to claim 1, characterized by the fact that in situ metals/metalloids including their isotopes from the fourth, fifth, and sixth main group of the periodic system of the elements are converted electrochemically to volatile hydrides.

7. Process according to claim 1, characterized by the fact that ions, complex ions, and collids are deposited selectively on the electrodes by choice of the electrode materials.

8. Process according to claim 1, characterized by the fact that the materials for the cathode are steel and aluminum and for the anode graphite, carbon materials, titanium, materials vapor-deposited with titanium, coated with titanium, or otherwise treated with titanium, and steels.

9. Process according to claim 1, characterized by the fact that the operating voltage is a DC current, a DC current with a residual ripple, a pulsing DC current, an AC current, or a frequency-modulated AC current.

10. Process according to claim 1, characterized by the fact that the electrodes (1, 2) are installed horizontally or vertically in the ground area (3).

11. Process according to claim 1, characterized by the fact that the electrode surface corresponds at least to a 5" or 6" tube.

12. Process according to claim 11, characterized by the fact that the electrodes are in the form of a tube or plate.

13. A process for decontamination of inorganic compounds from an area of interest, said process comprising the steps of:
  a) installing at least two electrodes in the area of interest;
  b) applying a current between said electrodes whereby voltage and amperage can be regulated in a controlled manner;
  c) increasing the current until the electrokinetic point in the area of interest is determined;
  d) reducing the current to a value below the electrokinetic point for a specific period of time to modify inorganic compounds are modified so that they can be electrokinetically mobilized;
  e) increasing the current to a value above the electrokinetic point so that the modified inorganic compounds are mobilized in the area of interest and deposited on the electrodes; and
  f) maintaining the current in step e) for a period of time until the concentration of inorganic compounds is reduced to a specified level.

14. The process according to claim 13, wherein the operating voltage is a DC current, a DC current with a residual ripple, a pulsing DC current, an AC current, or a frequency-modulated AC current.

15. The process according to claim 13, wherein in situ water-insoluble inorganic compounds are decomposed electrochemically into their elementary basic components.

16. The process according to claim 13, wherein in situ non-polar inorganic substances are converted into colloids.

17. The process according to claim 13, wherein the maintaining of the current at the first voltage and amperage below the electrokinetic point causes in situ complexing of atoms and molecules to form a hydroxocomplex or chlorocomplex ions and/or ammine salts.

18. The process according to claim 17, wherein the in situ components generated electrochemically comprise atoms selected from the group consisting of oxygen atoms, CN radicals, water molecules, or $NH_3$ groups.

19. The process according to claim 13, wherein the ions, complex ions, and colloids are deposited selectively on the electrodes by choice of the electrode materials.

20. The process according to claim 19, wherein the for the cathode materials are selected from steel and aluminum, and the anode materials are selected from graphite, carbon materials, titanium, materials vapor-deposited with titanium, coated with titanium, or otherwise treated with titanium.

21. A process for decontamination of inorganic compounds from an area of interest, said process comprising the steps of:
  a) installing at least two electrodes in the area of interest;
  b) applying a current between said electrodes whereby voltage and amperage can be regulated in a controlled manner;
  c) maintaining the current at a first voltage and amperage below the electrokinetic point for a period of time so that inorganic compounds are modified;
  d) applying a second voltage and amperage that is above the electrokinetic point for a period of time so that inorganic compounds are electrokinetically mobilized in the area of interest and deposited on the electrodes; and
  e) maintaining the current in step d) for a period of time until the concentration of inorganic compounds is reduced to a specified level.

* * * * *